(12) United States Patent (10) Patent No.: US 12,470,842 B2
Lin et al. (45) Date of Patent: Nov. 11, 2025

(54) MULTIFOCAL CAMERA BY REFRACTIVE INSERTION AND REMOVAL MECHANISM

(71) Applicant: Dell Products L.P., Round Rock, TX (US)

(72) Inventors: Yi-Hsien Lin, Taipei (TW); Chih-Hao Kao, Singapore (SG); Ghee Beng Ooi, Singapore (SG)

(73) Assignee: Dell Products L.P., Round Rock, TX (US)

( * ) Notice: Subject to any disclaimer, the term of this patent is extended or adjusted under 35 U.S.C. 154(b) by 243 days.

(21) Appl. No.: 17/837,551

(22) Filed: Jun. 10, 2022

(65) Prior Publication Data

US 2023/0403476 A1 Dec. 14, 2023

(51) Int. Cl.
*H04N 23/959* (2023.01)
*G02B 5/20* (2006.01)
(Continued)

(52) U.S. Cl.
CPC ............ *H04N 23/959* (2023.01); *G02B 7/40* (2013.01); *G03B 13/20* (2013.01); *G03B 13/36* (2013.01); *G03B 30/00* (2021.01); *G06F 1/1686* (2013.01); *H04N 23/51* (2023.01); *H04N 23/55* (2023.01); *H04N 23/63* (2023.01); *G02B 5/208* (2013.01); *G03B 11/00* (2013.01)

(58) Field of Classification Search
CPC ...... H04N 23/959; H04N 23/51; H04N 23/55; H04N 23/63; H04N 23/673; G02B 7/40; G02B 5/208; G03B 13/20; G03B 13/36; G03B 30/00; G06F 1/1686; G06F 1/1637; G06F 1/1684

USPC .......................................................... 348/135
See application file for complete search history.

(56) References Cited

U.S. PATENT DOCUMENTS 8,896,744 B2 11/2014 Ogasahara et al.
10,018,804 B2 * 7/2018 Prabhakar ............ H04N 23/667
(Continued)

FOREIGN PATENT DOCUMENTS

JP 2015200838 A * 11/2015

*Primary Examiner* — William C Vaughn, Jr.
*Assistant Examiner* — Astewaye Gettu Zewede
(74) *Attorney, Agent, or Firm* — Zagorin Cave LLP; Robert W. Holland

(57) ABSTRACT

An information handling system camera that includes a rapid focus capability for near and far objects by selectively inserting and removing a refractive material between the camera lens and image sensor to effectively adjust the camera focusing distance. When far object focus is desired, a refractive material of predefined properties is inserted to enable an instant focus of the far object to the image sensor. When a near object focus is desired, the refractive material is removed (or replaced with a thinner material) to rapidly achieve focus. In addition, a voice coil motor or other actuator fine tunes the focus when desired. In one alternative embodiment, focus is performed only with the insertion and retraction of the refractive material so that no lens actuator is included in the camera. The refractive material extends the back focal distance between the lens and image sensor relative to the back focal distance without the refractive material. Rapid insertion of refractive material shortens the time to adjust focus relative to focus time associated with actuator-based lens movement focus.

16 Claims, 10 Drawing Sheets

(51) Int. Cl.
*G02B 7/40* (2021.01)
*G03B 11/00* (2021.01)
*G03B 13/20* (2021.01)
*G03B 13/36* (2021.01)
*G03B 30/00* (2021.01)
*G06F 1/16* (2006.01)
*H04N 23/51* (2023.01)
*H04N 23/55* (2023.01)
*H04N 23/63* (2023.01)

(56) References Cited

U.S. PATENT DOCUMENTS

| | | | |
|---|---|---|---|
| 10,353,171 B2 * | 7/2019 | Hatada | G02B 9/62 |
| 10,830,931 B2 | 11/2020 | Kubo et al. | |
| 10,893,248 B2 | 1/2021 | Otsubo et al. | |
| 10,958,847 B2 | 3/2021 | Sakamoto et al. | |
| 11,163,097 B1 * | 11/2021 | Brailovskiy | G03B 5/02 |
| 2012/0262624 A1 * | 10/2012 | Takemoto | G03B 11/00 |
| | | | 348/360 |
| 2016/0148048 A1 * | 5/2016 | Prabhakar | G06V 40/197 |
| | | | 348/78 |
| 2017/0068108 A1 * | 3/2017 | Kim | G02B 13/002 |
| 2020/0000335 A1 * | 1/2020 | Yoshino | A61B 3/152 |
| 2020/0064640 A1 * | 2/2020 | Nagano | H04N 5/74 |
| 2020/0068102 A1 * | 2/2020 | Tilleman | H04N 23/56 |
| 2020/0169679 A1 * | 5/2020 | Matsumura | H04N 25/671 |
| 2020/0326505 A1 * | 10/2020 | Okuoka | G02B 13/02 |
| 2022/0174200 A1 * | 6/2022 | Xiong | H04N 23/80 |
| 2022/0308313 A1 * | 9/2022 | Yamashita | G02B 7/36 |

* cited by examiner

MULTIFOCAL CAMERA BY REFRACTIVE INSERTION AND REMOVAL MECHANISM

BACKGROUND OF THE INVENTION

Field of the Invention

The present invention relates in general to the field of information handling system cameras, and more particularly to an information handling system multifocal camera by refractive insertion and removal mechanism.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

Generally portable information handling systems include a camera to capture visual images, such as in support of a video conference. Tablet information handling systems often include a camera at the rear surface to allow an end user to capture visual images while viewing the visual images at the tablet display, and also include a camera on the display side to support capture of a visual image of the end user while performing a video conference. Convertible systems typically include a camera in the lid housing portion to capture the end user during video conferences as the end user views the integrated display. In many instances, an information handling system may also interface with a peripheral camera that is separate from the information handling system and interfaced by a cable or wireless signals. One advantage of a peripheral housing is that an increased amount of room in the housing allows for improved optics and greater movement of the lens to support focus of the camera. Typically, a lens is moved relative to an image sensor to adjust the focus of the camera by applying a control signal to a voice coil motor (VCM) or other actuator. One difficulty with the use of a VCM is that the focus process tends to be slow and can take three seconds or more. During the focus process, the end user may have a blurred image that detracts from the user experience. In addition, the contrast focus logic of a typical camera can center on an incorrect object, such as in the near view of the camera, resulting in a poor image of a more distal object of interest. While this difficulty can be somewhat managed by manufacture of the camera to have a limited focus capability on near objects, limiting focus capability in this manner can limit the camera operability for some functions, such as capture of visual images of a document place near the camera lens.

SUMMARY OF THE INVENTION

Therefore, a need has arisen for a system and method which provides rapid focus adjustments for an information handling system camera.

In accordance with the present invention, a system and method are provided which substantially reduce the disadvantages and problems associated with previous methods and systems for adjusting a camera focus. A refractive material is inserted between and retracted from a position between the camera lens and image sensor to rapidly adjust the camera to operate at different focal distances.

More specifically, an information handling system processes information with a processor and memory that cooperate to execute instructions, such as an operating system and applications like a videoconference application that used visual images captured by a camera. The camera may be integrated in the information handling system housing or operate as a separate peripheral device that interfaces through a cable or wireless signals. The camera includes a lens that captures light along an image capture axis and focuses the light to an image sensor that converts the light to digital information. A lens focus actuator moves the lens relative to the images sensor to adjust the focal distance of the camera, such as to support focus with an image contrast analysis or a distance determined to an object by a time of flight sensor or other distance sensor. In addition the camera includes an insertion focus actuator that selectively inserts and retracts a refraction material between the lens and image sensor to convert the camera between infinity and macro modes. A processing resource of the camera controls the insertion and removal of the refraction material based upon a desired focus response of the camera so that the focus is achieved in a more rapid manner where insertion and removal of the refraction material is performed in a rapid manner relative to the focus achieved by lens movement, such as with a VCM actuator.

The present invention provides a number of important technical advantages. One example of an important technical advantage is that an information handling system camera has a more rapid focus response when shifting the captured visual image between infinity and macro view. The refractive material is rapidly inserted and removed to change an object focus distance without lens movement by a VCM or similar actuator. The refractive material has a minimal cost with a planar transparent material that does not need machining like a lens and that can offer a secondary function of filtering light, such as with an infrared cut filter treatment. As an example, plural infrared cut filter removal systems may integrate in the camera with each having an infrared cut filter of different thickness so that the camera can select a filter to insert and remove based upon desired focal distance for the camera. In one embodiment, selection of insertion and removal of the refraction material adjusts a minimum focus of the camera so that contrast focus of the camera operates on a selected of a distal or nearby object within the camera field of view.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system includes a multifocal camera that adjusts focus with a refraction material insertion and removal. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
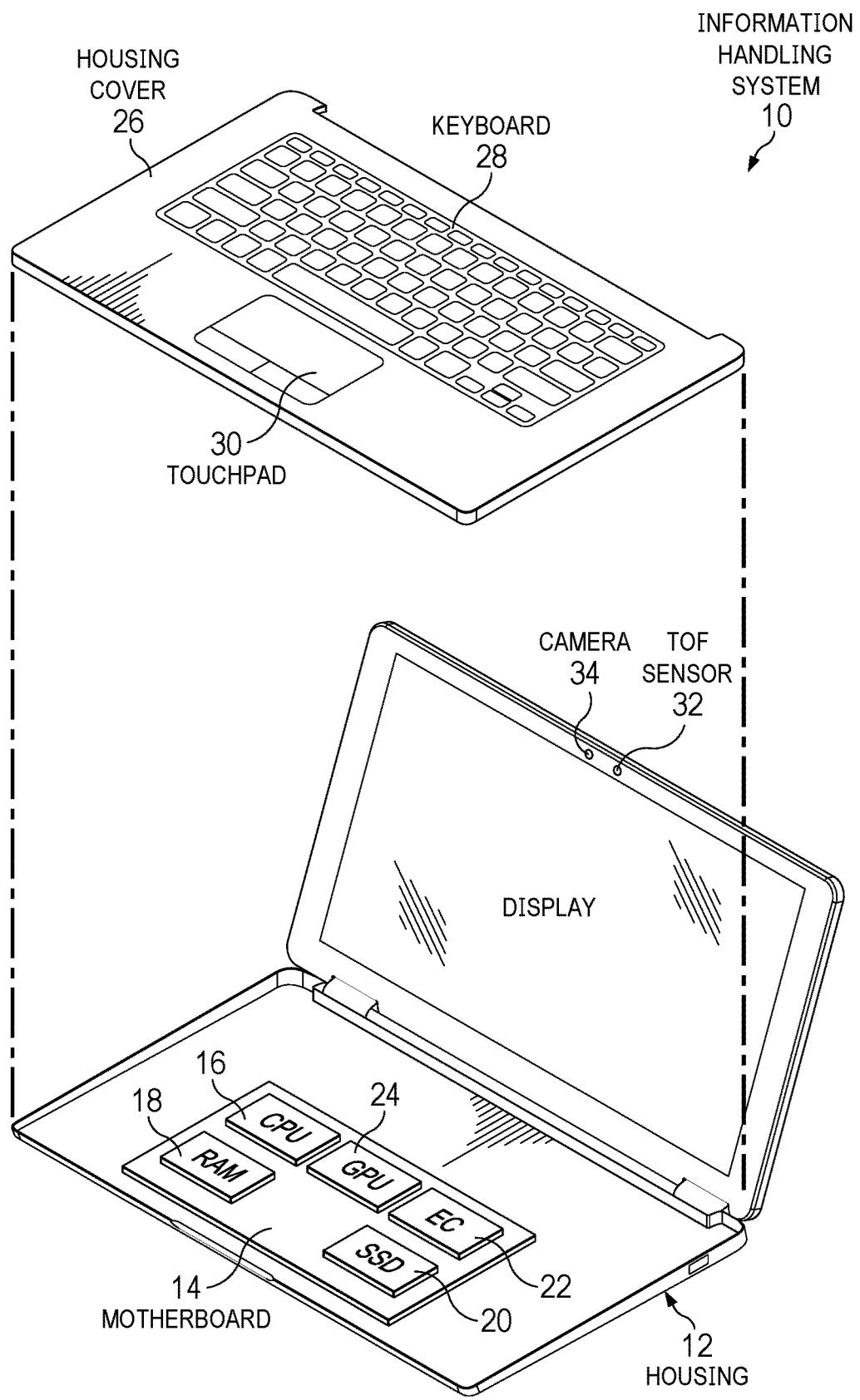
FIG. 1 depicts an exploded perspective view of a portable information handling system having a multifocal camera having focus achieved by refractive insertion and removal.

Referring now to FIG. 1, an exploded perspective view depicts a portable information handling system 10 having a multifocal camera 34 having focus achieved by refractive insertion and removal. Portable information handling system 10 is built in a portable housing 12 that converts between open and closed positions. In alternative embodiments, housing 12 may have a planar form factor to support a tablet information handling system having camera 34 at a front and/or rear side. A motherboard 14 coupled to housing 12 interfaces processing components that cooperate to process information. For example, a central processing unit (CPU) 16 executes instructions to process information in cooperation with a random access memory (RAM) 18 that stores the instructions and information. A solid state drive (SSD) 20 provides persistent storage that stores the instructions and information, such as an operating system that is retrieved at power up to RAM 18 for execution on CPU 16. An embedded controller (EC) 22 executes firmware instructions to manage operational conditions of the processing components, such as the application of power, maintenance of thermal conditions and interactions at a physical level with input and output (I/O) devices. A graphics processing unit (GPU) 24 interfaces with CPU 16 to further process information for presentation at a display, such as the display in housing 12 or a peripheral display. In the example embodiment, a housing cover 26 couples over the processing components and includes a keyboard 28 and touchpad 30 that accept end user inputs.

In the example embodiment, housing 12 integrates a display in a lid portion that rotates to a raised position over a main housing portion. A camera 34 and a time-of-flight sensor 32 integrate in housing 12 near the display to support capture of visual images of an end user viewing the display, such as to support a video conference. Although the example embodiment depicts a camera 34 integrated in housing 12 of a portable information handling system 10, alternative embodiments may include a peripheral camera in a separate housing interfaced with an information handling system by a cable or by wireless signals or a camera integrated with a peripheral display. Camera 34 has an automated focus feature to capture quality visual images of an object, such as an end user within the camera field of view. The focus of the image is adjusted as the object distance changes relative to camera 34 by changing the physical distance between a lens of the camera and an image sensor of the camera as set forth in greater detail below. The automated focus may use contrast analysis of the captured visual image or a distance detected by time of flight sensor 34 or other similar sensors. The automated focus can take an extended time, such as three or more seconds, when the change in lens position to achieve focus is large. The automated focus may also run into difficulties where multiple objects are near the camera so that the camera focuses on a nearby object instead of an object of interest. To provide a more rapid focus time and a focus centered on a desired object, camera 34 includes a lens construct multi focus achieved by the insertion and removal of a refraction material between the lens and the image sensor.

Figure 2A:
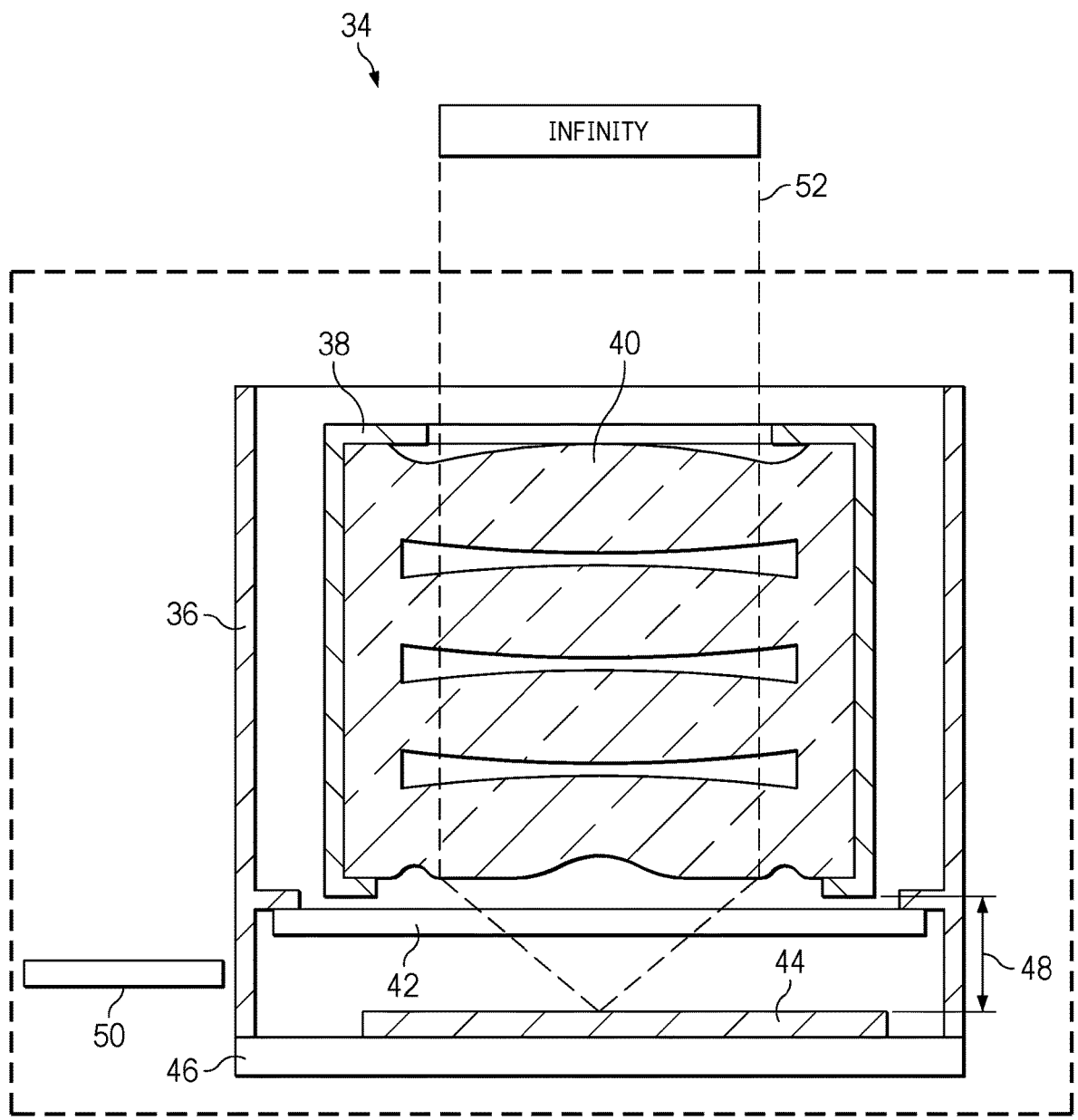
FIGS. 2A, 2B and 2C depict a cross-sectional view of a camera having both lens-based focus and refractive material-based focus.
Figure 2B:
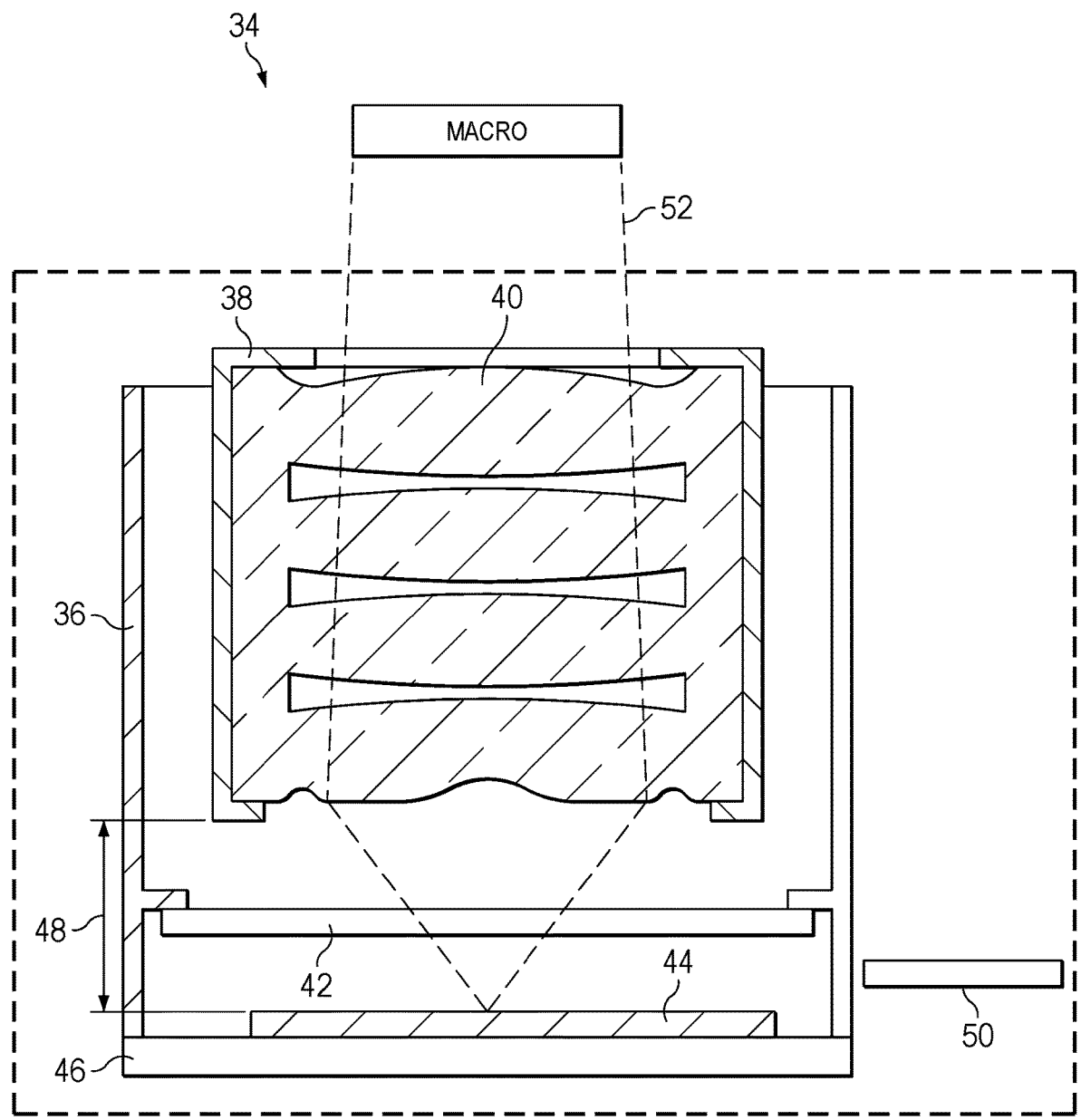
Figure 2C:
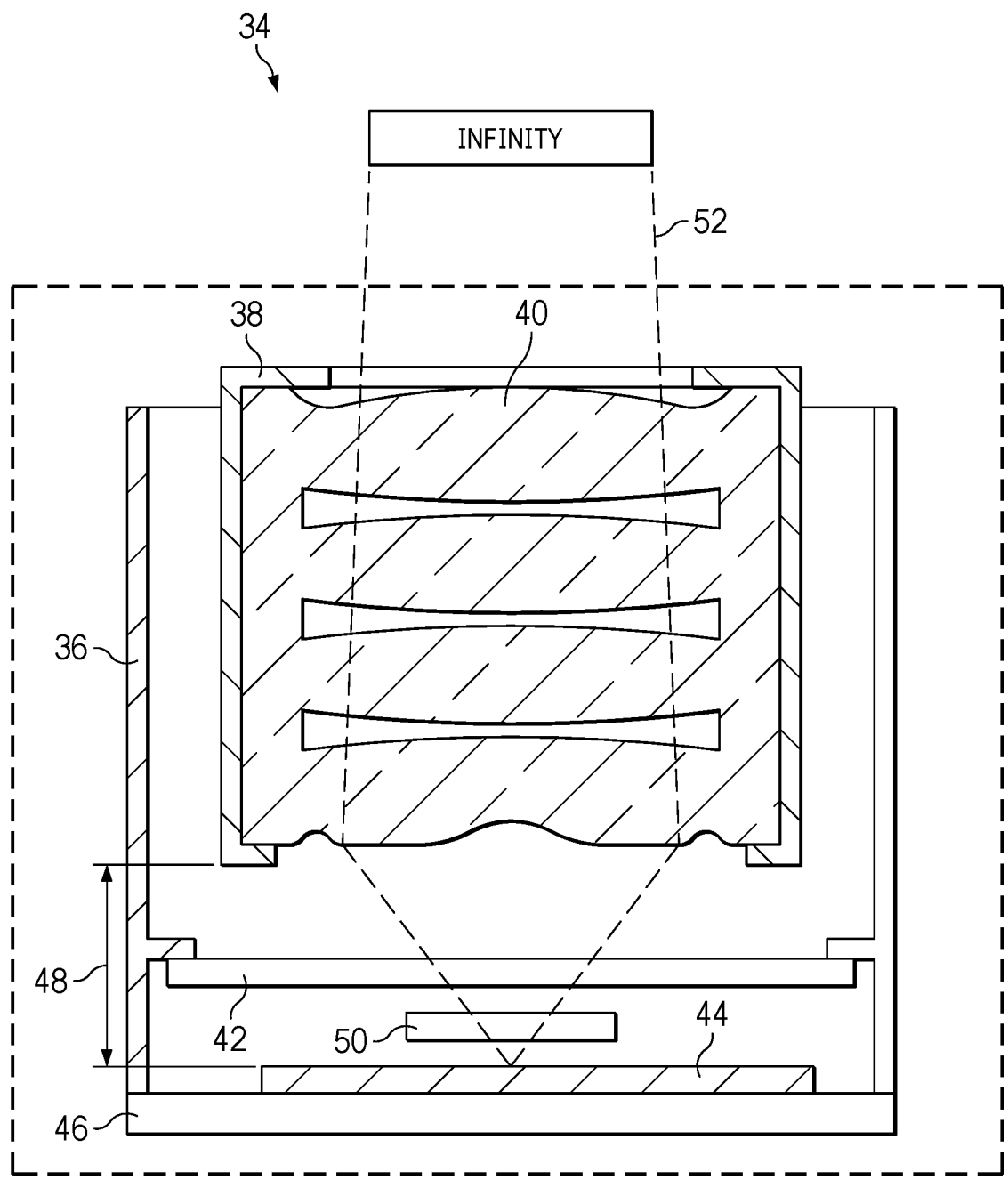

Referring now to FIGS. 2A, 2B and 2C, a cross-sectional view depicts a camera 34 having both lens-based focus and refractive material-based focus. FIG. 2A depicts a sectional view of camera 34 focused to infinity for light 52 to an image sensor 44 directed by a lens 40 vertical position relative to image sensor 44. Generally, the distance from the center of lens 40 to the image sensor is called the focal length of the lens that is further defined to have a front focusing distance from the front side to the rear side of lens 40 and a back focal distance from the rear side of lens 40 to an image sensor 44. A lens focus actuator 38 secured in a camera housing 36 adjusts the vertical position of lens 40 relative to image sensor 44 to provide focus for an object detected in the camera field of view. For example, focus logic may execute locally on a processing resource of the camera by analyzing sensed visual images to focus based upon detected contrasts. Alternatively, focus may be achieved with a distance for the camera to the object that is detected by a time of flight or similar sensor. In the example embodiment, actuator 38 is a voice coil motor (VCM), also known as a voice coil actuator (VCA) that uses a magnet and yoke in conjunction with a coil to adjust the position of lens 40 relative to a substrate 46 that supports image sensor 44. A VCM coil and magnet are concentric about a common axis with an engineered magnetic return path to provide rectilinear motion of lens 40 with the movement of the coil providing both high speed motion and accurate positioning that results in a precise focus response. In the example embodiment, an infrared cut filter is disposed between lens 40 and image sensor 44 to filter out infrared light that can disrupt detection of the visual light by image sensor 44. A refraction material 50 is aligned to insert between lens 40 and image sensor 44 as describe below in greater detail.

FIG. 2B depicts an example embodiment in which actuator 38 has vertically moved lens 40 away from image sensor 44 to provide a macros focus for an object located closer to camera 34, as indicated by distance 48. Movement of actuator 38 to focus on a close object when in an infinity mode can take an extended time period, such as three seconds more, that disrupts the end user experience. To achieve a more rapid transition between an infinity focus mode and a macro focus mode, refractive material 50 is selectively inserted and removed so that the focus mode of camera 34 rapidly changes without moving lens 38 relative to image sensor 44. Essentially, insertion or removal of refractive material changes the back focal distance of lens 40 to rapidly adjust the camera focus. For example, refractive material is transparent to visible light, such as glass, and has a planar shape coupled to an insertion actuator that inserts and retracts the refractive material between the lens and image sensor based upon a command from a camera processing resource for the infinity or macro viewing mode. Once the insertion or retraction of refractive material 50 is complete, precise focus is completed by actuator 38 in a more rapid fashion with minimal lens movement. In one example embodiment, the camera focus range with the refraction material inserted between the lens and image sensor is substantially 0.45M to infinity, and is 0.21M to substantially 0.45M when the refraction material is removed from between the lens and the image sensor FIG. 2C depicts insertion of refractive material 50 between lens 38 and image sensor to convert the camera to an infinity mode for capturing visual images as opposed to the infinity mode of FIG. 2A, which was accomplished by actuator 38 movement of lens 40. In the example embodiment, all three depicted configurations of the lens position and refractive material position may be selected as desired to provide an optimal camera response.

Figure 3A:
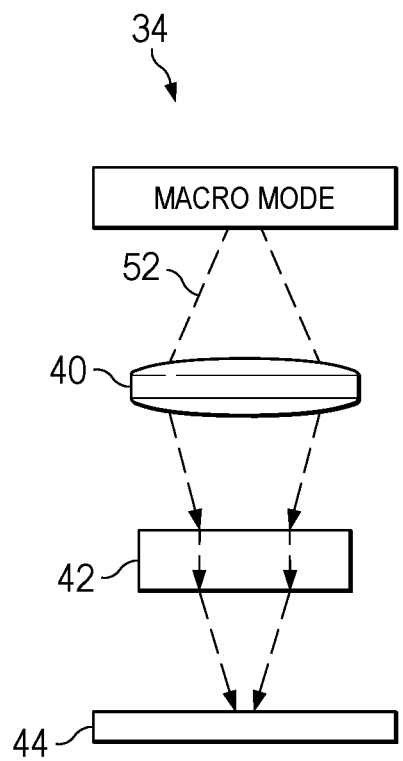
FIGS. 3A and 3B depict an example embodiment of refractive material-based focus provided by insertion actuators.
Figure 3B:
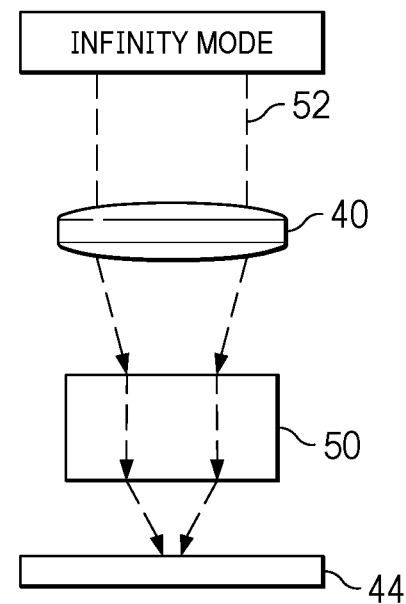

Referring now to FIGS. 3A and 3B, an example embodiment depicts refractive material-based focus provided by insertion actuators. FIG. 3A depicts a sectional view of camera 34 having an infrared cut filter 42 that is selectively inserted or retracted between lens 40 and image sensor 44 to filter infrared light during daylight operation. During low light operations when sensor 44 relies upon infrared illumination to capture visual images, infrared cut filter 42 is retracted, such as with a conventional infrared cut filter removal (ICR) mechanism. Infrared cut filter 42 has a minimal thickness that does not substantially impact focus of camera 34 to permit light 52 capture in a macro mode. FIG. 3B depicts camera 34 with infrared filter 42 removed from between lens 40 and image sensor 44 and refractive material 50 inserted instead with a treatment to provide infrared filtering. Refractive material 50 has a thickness that provides refractive correction to the focus of light 50 so that an infinity mode is provided. The thickness of refractive material 50 may vary depending upon the desired focusing distance, the distance between lens 40 and image sensor 44 and the type of refractive material. Generally, Snell's law defines the impact of refractive material 50 on focus at a defined object distance. The example embodiment does not include an actuator to move lens 40, however, a lens actuator may be included to provide more precise focus adjustments whether or not refractive material 50 is inserted. In an alternative embodiment, refractive material 50 may be a transparent material that does not include an infrared cut filter treatment. In such an embodiment, infrared cut filter 42 may be inserted along with refractive material 50 in the infinity mode so that rapid focus and selective infrared filtering are supported.

Figure 4A:
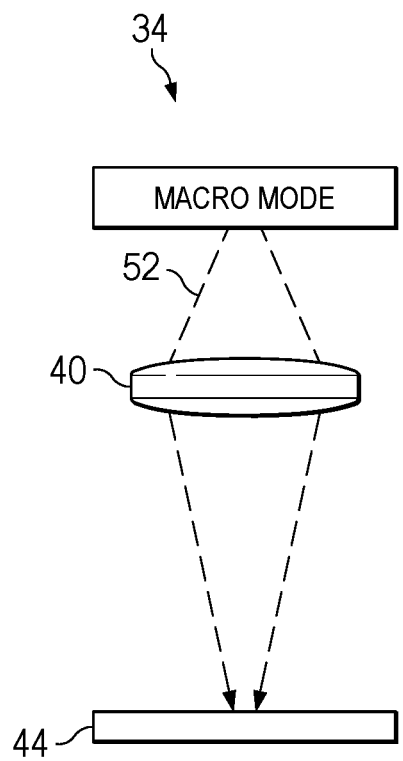
FIGS. 4A and 4B depict another example embodiment of refractive material-based focus provided by insertion actuators.
Figure 4B:
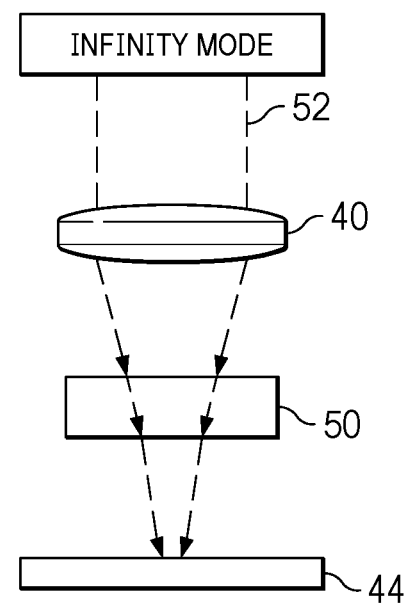

Referring now to FIGS. 4A and 4B, another example embodiment depicts refractive material-based focus provided by insertion actuators. FIG. 4A depicts a lens 40 having an infrared cut filter treatment that focuses light 52 on an image sensor 44 in a macro mode. The infrared treatment is, for example, appropriate where image sensor 44 does not capture infrared images. FIG. 4B depicts lens 40 with the infrared cut filter treatment converted to an infinity mode by insertion of a transparent refraction material 50 between lens 40 and image sensor 44 to refract light 52. Refraction material 50 is a planar and transparent material that does not include an infrared cut filter and that has a uniform effect on light that passes from the upper to the lower surface so that the focus of camera 34 shifts to the infinity mode. When a macro mode is desired, refraction material 50 is withdrawn to provide the configuration of FIG. 4A.

Figure 5A:
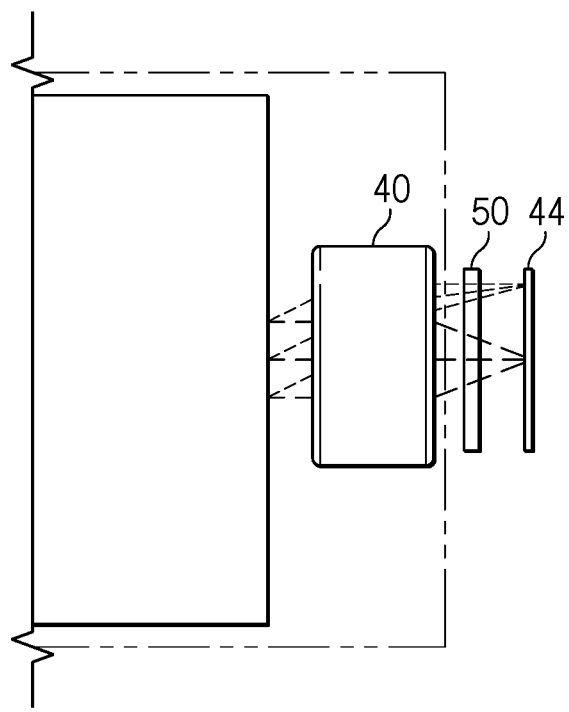
FIGS. 5A, 5B and 5C depict examples of focus provided by insertion and removal of a refraction material between a camera lens and image sensor.
Figure 5A:
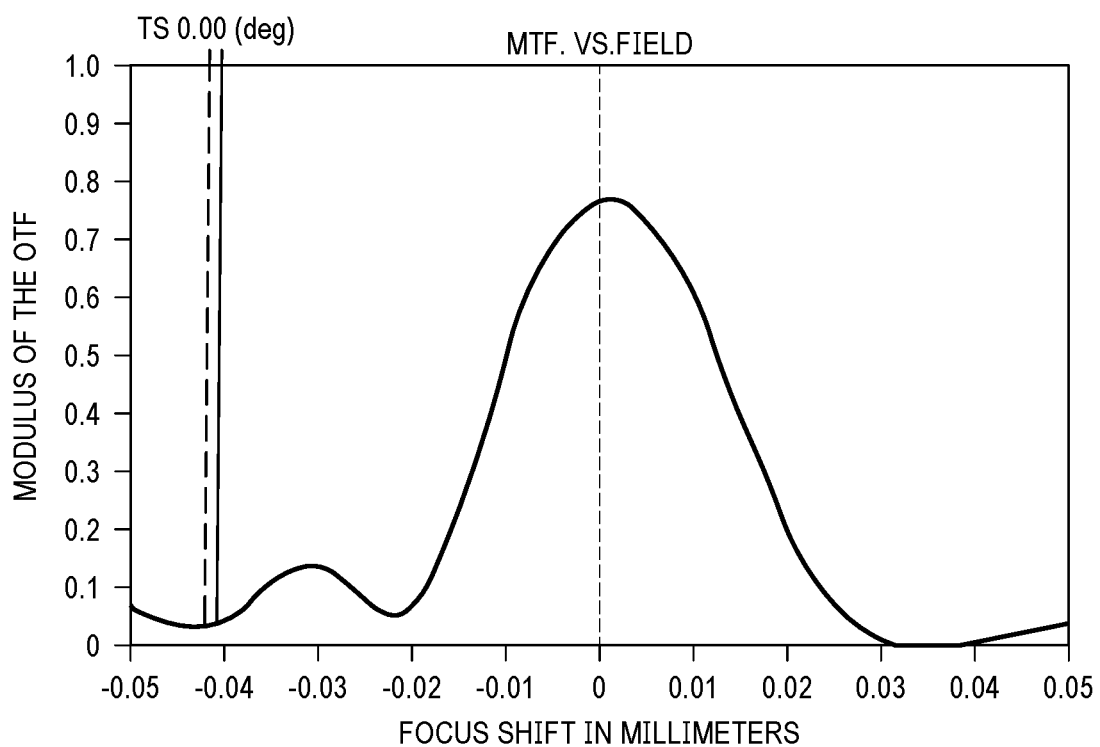
Figure 5B:
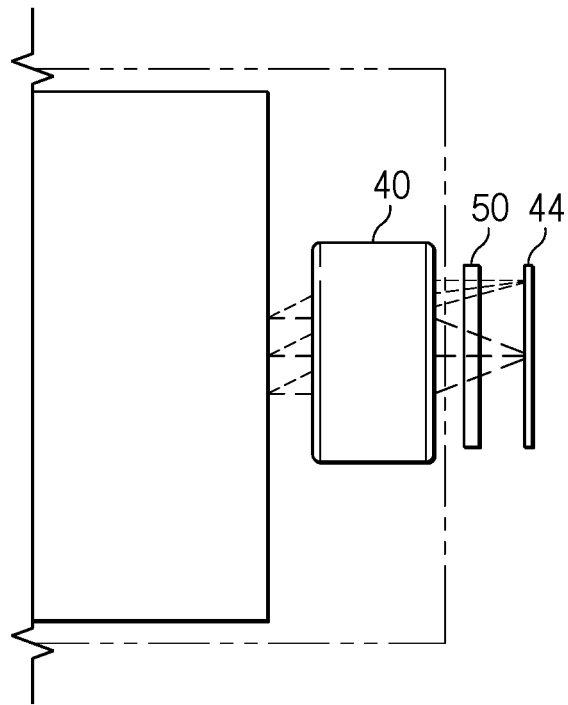
Figure 5B:
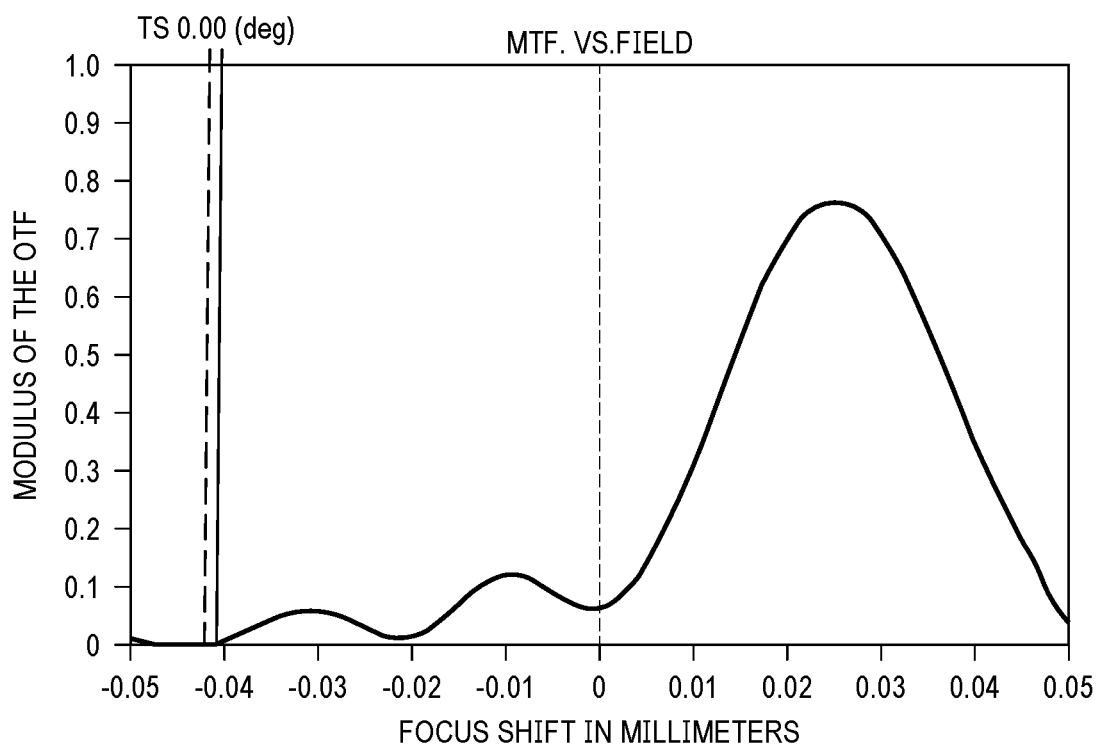
Figure 5C:
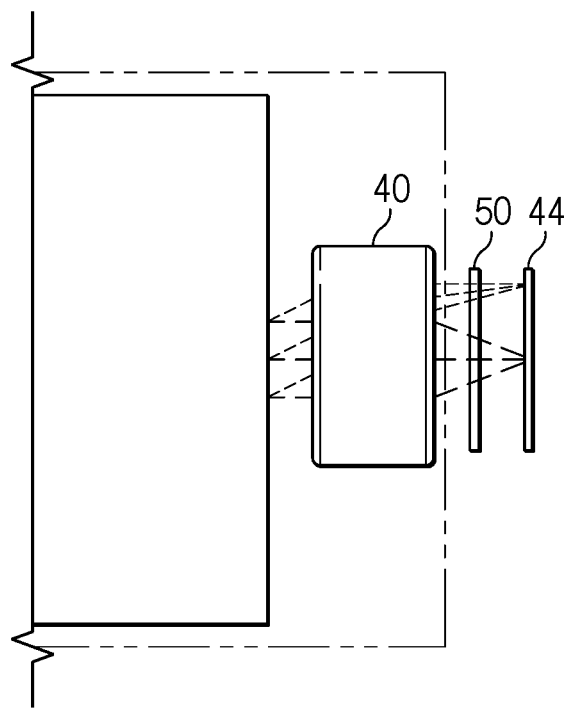
Figure 5C:
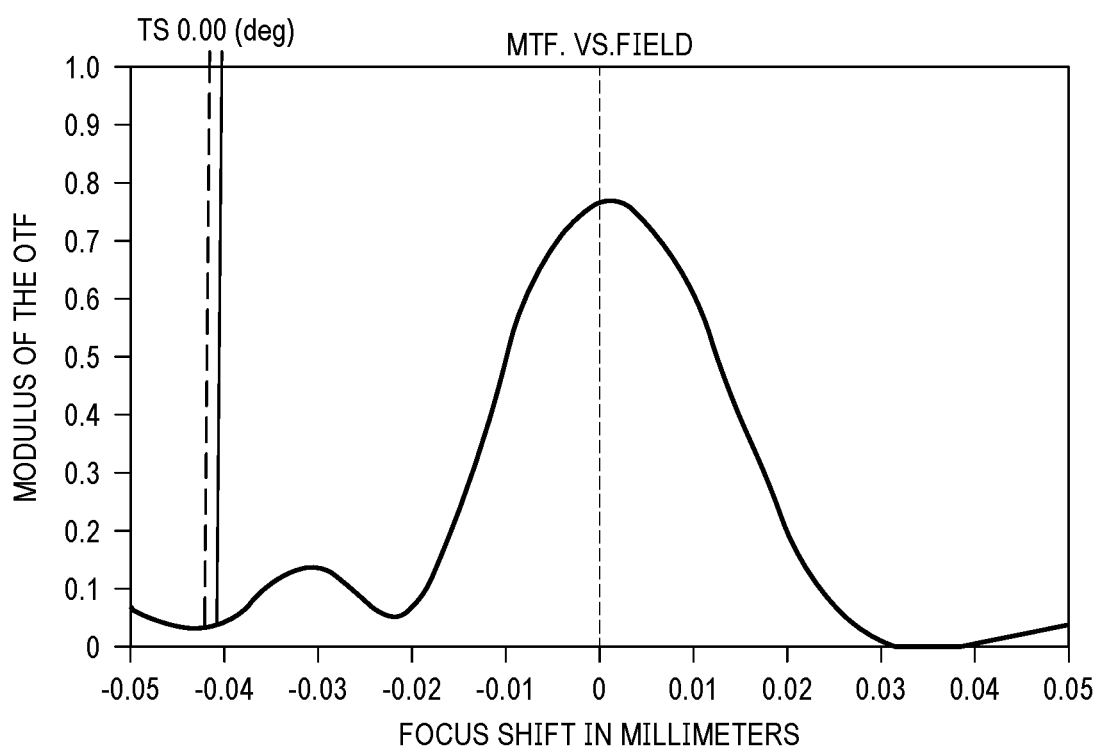

Referring now to FIGS. 5A, 5B and 5C, examples are depicted of focus provided by insertion and removal of a refraction material between a camera lens and image sensor. FIG. 5A depicts a camera lens 40 having an infinity focal distance that passes light through a 0.3 mm glass refractive material 50 to an image sensor 44 that captures the visual image for the camera. As an example, refractive material 50 provides an infrared cut filter with a thicker glass to offer the infinity focus and a reference focus shift of zero depicted by the graph. FIG. 5B depicts movement of lens 40 to a 0.3 m focusing distance through a 0.3 mm refractive material 50 to provide a macro mode for camera focus. The movement of lens 40 to achieve the close focus takes time, such as three or more seconds for a typical VCM actuator. FIG. 5C depicts a change from refractive material of 0.3 mm to refractive material of 0.21 mm, such as by swapping an infrared cut filter with a ICR mechanism from a thicker glass to a thinner glass. Although the focal distance for the position of lens 40 remains at 0.3 m as with FIG. 5B, the focus of the camera shifts to the infinity mode of FIG. 5A. In various embodiments, different thicknesses of refractive material may be used to insert and remove between the lens and image sensor to achieve a desired infinity and/or macro focus with a rapid response.

Figure 6:
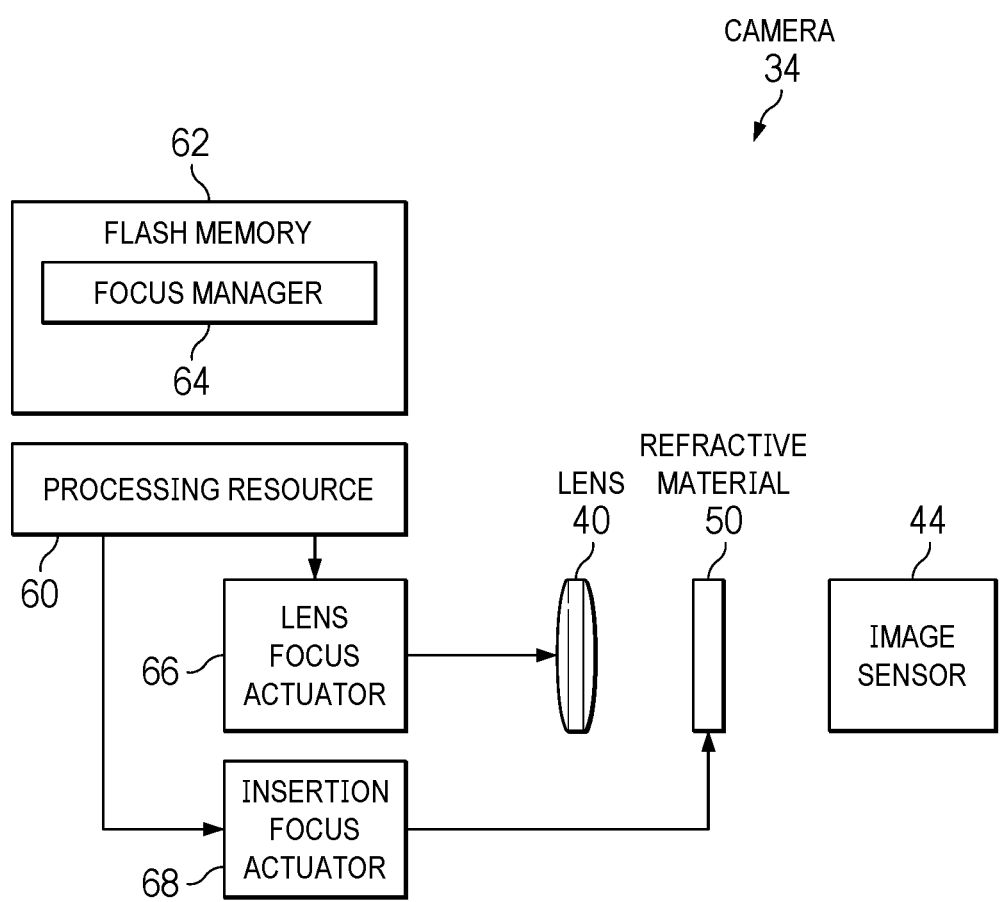
FIG. 6 depicts a block diagram of a camera configured to adjust focus between infinity and macro modes by insertion and removal of a refraction material.

Referring now to FIG. 6, a block diagram depicts a camera 34 configured to adjust focus between infinity and macro modes by insertion and removal of a refraction material. Camera 34 includes a processing resource 60 that executes firmware instructions stored in non-transitory memory, such as a flash memory 62. For instance, a focus manager 64 stored in flash memory 62 is retrieved to processing resource 60 and execute to manage a transition of camera 34 between macro and infinity focus modes. Processing resource 60 interfaces with a lens focus actuator 66 to command movement of lens 40 relative to image sensor 44 that adjust the focusing distance. Processing resource 60 also interfaces with an insertion focus actuator 68 to command insertion and removal of one or more refractive materials 50 that adjust the focusing distance between a macro and an infinity mode. For instance, insertion focus actuator is an infrared cut filter removal (ICR) system that inserts and removes one or more refractive materials to adjust the focusing distance of camera 34. Some or all of the refractive materials may have an infrared cut filter treatment so that processing resource 60 may simultaneously manage both infrared filtering of captured light and focusing distance by selecting which of plural refractive materials to insert. Processing resource 60 detects that a change in focus is called for and commands the change in focus based upon the amount of change that is needed and the position of lens focus actuator 66 and insertion focus actuator 68. The change in focusing distance may be based upon an image captured by image sensor 44, such as with contrast analysis, or a distance provided from an external sensor, such as a time of flight sensor. In addition, processing resource may interface with an external device, such as the information handling system CPU, to command the infinity and macro modes. For instance, an end user might elect to command an infinity mode when giving a presentation at a distance from camera versus a macro mode when using the camera to show a document at a close range. The infinity and macro modes may be offered as selections available from the operating system where the user selects a mode with the understanding that staying in a selected mode by overriding camera operations may delay camera focus responsiveness. In one embodiment, the camera may avoid inclusion of a lens actuator entirely by relying only on the insertion and removal of the refractive material to establish focus. Using only the refractive material to achieve focus reduces the cost of the camera by avoiding the expense of a lens actuator entirely.

As an example use case, an end user of camera 34 in close proximity to lens 40 may have the camera focus on her face in a macro mode due to the short focusing distance. The camera focus may be based upon directional microphone that detects the end user as a speaking participant in a videoconference. If another participant speaks in the camera field of view at a greater distance away, the directional microphone locates the speaker and a time of flight sensor determines the distance to the speaker to provide a more rapid focus. In response to the second speaker's greater distance from the camera, a refractive material is inserted between the camera lens and image sensor to change camera from the macro mode to an infinity mode having the more distant end user in focus without changing the camera lens position, or only slightly adjusting camera focus with a VCM actuator based on contrast analysis. When the distant speaker finishes, the refractive material is removed to return the camera to the macro mode for focus on the closer participant. Although the example embodiment has a planar refractive material that is not formed as a lens, in alternative embodiment the refractive material may have some machined surface that is nonplanar to provide a lens effect. In addition, the image sensor or camera processing resource logic may include focus corrections that are applied when the refractive material is inserted.

Although the present invention has been described in detail, it should be understood that various changes, substitutions and alterations can be made hereto without departing from the spirit and scope of the invention as defined by the appended claims.

What is claimed is:

1. An information handling system comprising:
a housing;
a processor disposed in the housing and operable to executed instructions that process information;
a memory disposed in the housing and interfaced with the processor, the memory operable to store the instructions and information;
a display coupled to the housing and interfaced with the processor, the display operable to present the information as visual images;
a time of flight sensor coupled to the housing and operable to detect a distance to the object;
a camera coupled to the housing and interfaced with the processor, the camera having a lens to capture light on an image axis, an image sensor aligned with the lens on the image axis to receive the light, an insertion actuator operable to insert and remove one or more refraction materials between the lens and the image sensor, a focus actuator to adjust focus by adjusting the lens, and a processing resource interfaced with the insertion actuator; and
a non-transitory memory interfaced with the processing resource and storing instructions that when executed on the processing resource cause:
command to the insertion actuator to change the refraction material position between the lens and the image sensor and capture the visual image of the object with a second focus in response to a first and a second predetermined condition;
wherein the first and second predetermined conditions comprise first and second distances to the object and a time to reach focus by the focus actuator with the refraction material inserted compared against a time to reach focus by the focus actuator with the refraction material removed, the refraction material position commanded that reaches focus in the least amount of time.

2. The information handling system of claim 1 wherein the refraction material comprises a transparent material of a thickness and refractive index that adjusts the focusing distance of the camera lens and image sensor by a predetermined amount when inserted between the camera lens and image sensor.

3. The information handling system of claim 2 wherein the camera focus range with the refraction material inserted between the lens and image sensor is substantially 0.45M to infinity and is 0.21M to substantially 0.45M when the refraction material is removed from between the lens and the image sensor.

4. The information handling system of claim 2 wherein the refraction material is transparent without a filter effect.

5. The information handling system of claim 1 wherein the insertion actuator further comprises:
a first refraction material of a thickness associated with a predetermined change in focusing distance and having an infrared cut filter; and a second refraction material of the thickness and without an infrared filter.

6. The information handling system of claim 1 further comprising:
a first refraction material of a first thickness associated with a predetermined change in the back focal distance and having an optical transparency; and
a second refraction material of a second thickness associated with substantially no change in the back focal distance.

7. The information handling system of claim 6 wherein the second refraction material comprises an infrared cut filter removal system.

8. A method for focusing a camera having a selectively inserted and retracted refraction material, the method comprising:
determining with a time of flight sensor a focusing distance of the camera to an object as a near distance or a far distance;
when the camera focusing distance is the near distance and the time to achieve focus by a focus actuator without the refraction material is less than the time to achieve focus by the focus actuator with the refraction material, retracting the refraction material from between a lens and an image sensor of the camera; and
when the camera focusing distance is the far distance and the time to achieve focus by the focus actuator with the refraction material is less than the time to achieve focus by the focus actuator without the refraction material, inserting the refraction material between the lens and image sensor.

9. The method of claim 8 wherein the predetermined amount is substantially 0.45M.

10. The method of claim 8 further comprising:
inserting and retracting the refraction material with an actuator normal to an image axis of the lens and image sensor.

11. The method of claim 8 further comprising:
applying an infrared cut filter treatment to the camera lens; and
inserting a refraction material having a transparency without an infrared cut filter.

12. The method of claim 8 further comprising:
treating the refractive material with an infrared cut filter.

13. The method of claim 12 further comprising:
inserting a refractive material having a transparency without an infrared cut filter; and
selectively inserting and retracting an infrared cut filter between the lens and the image sensor with an infrared cut filter removal system.

14. A camera comprising:
a lens to capture light on an image axis;
a focus actuator coupled with the lens to adjust focus of the lens by adjusting the lens;
an image sensor aligned with the lens on the image axis to receive the light;
a time of flight sensor aligned with the lens to detect a first distance and a second distance;
an insertion actuator operable to insert and remove a refraction material between the lens and the image sensor;
a processing resource interfaced with the insertion actuator; and
a non-transitory memory interfaced with the processing resource and storing instructions that when executed on the processing resource cause:
command to the insertion actuator to change the refraction material position between the lens and the image sensor and capture the visual image of the object with a first and second focus in response to a first and second distance to the object based at least in part upon a time to achieve focus by the focus actuator with the refraction material compared to a time to achieve focus by the focus actuator without the refraction material.

15. The camera of claim 14 further comprising:
an infrared cut filter removal system operable to insert and remove an infrared cut filter between the lens and image sensor independent of the insertion actuator; and
instructions that when executed on the processing resource cause the infrared cut filter to insert and remove based upon ambient light characteristics.

16. The camera of claim 14 wherein:
the lens has an infrared cut filter treatment; and
the refraction material has a transparency without an infrared cut filter.

* * * * *